Jan. 27, 1931.            N. TRBOJEVICH            1,790,606
                           WORM GEARING
                         Filed May 14, 1928        3 Sheets-Sheet 1
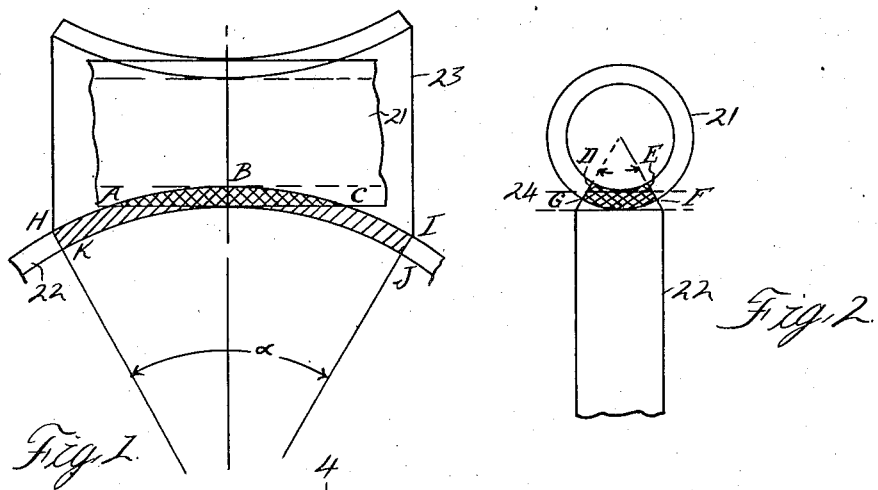
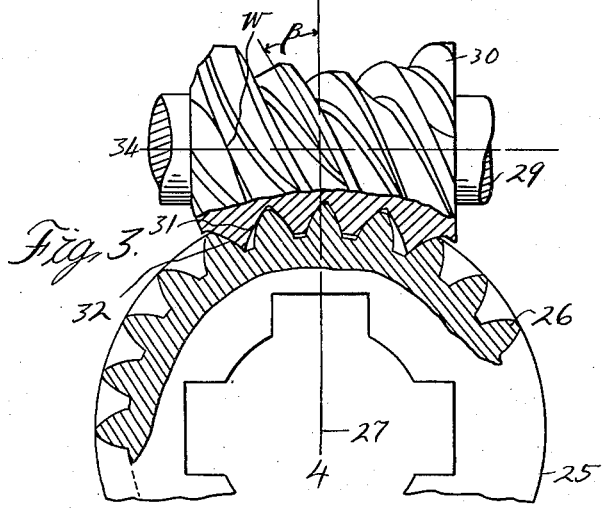
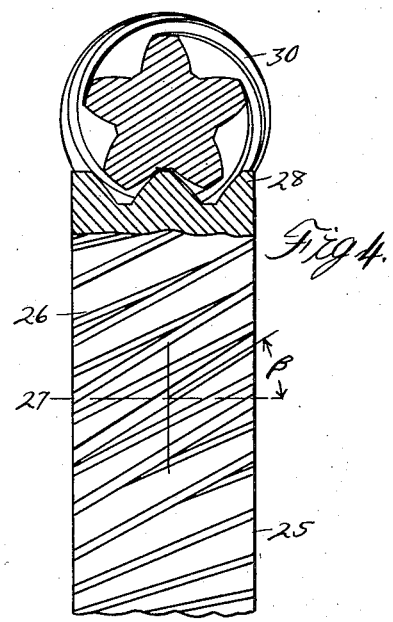
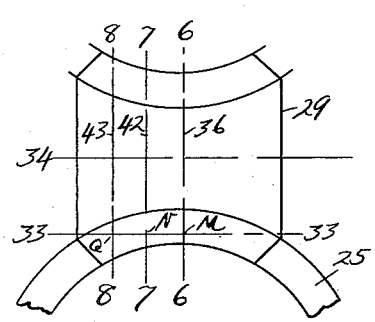
Inventor
Nikola Trbojevich
Attorneys Jan. 27, 1931.   N. TRBOJEVICH   1,790,606
WORM GEARING
Filed May 14, 1928    3 Sheets-Sheet 2
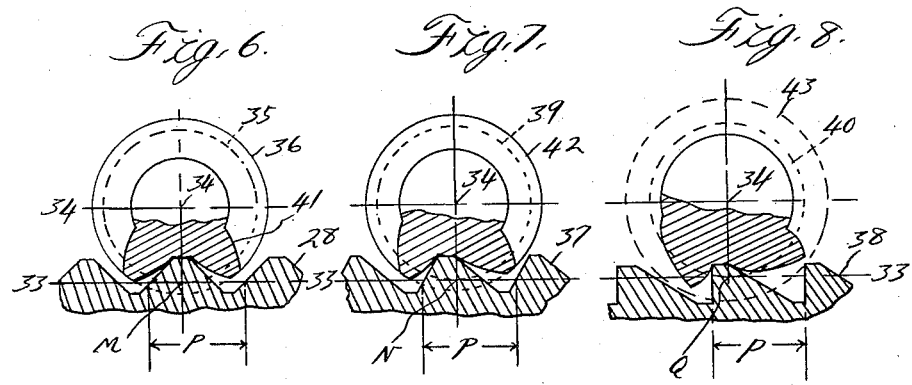
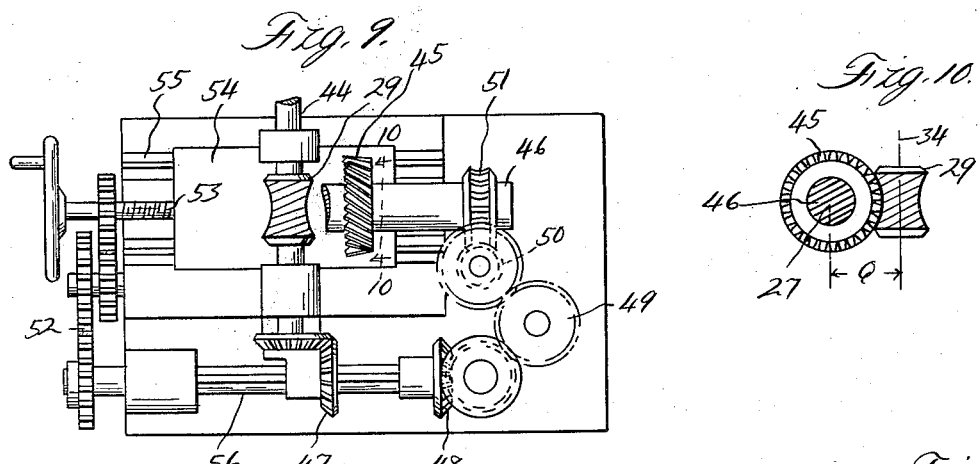
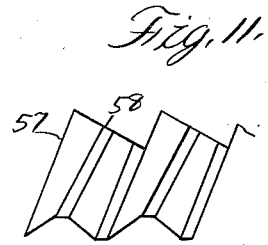
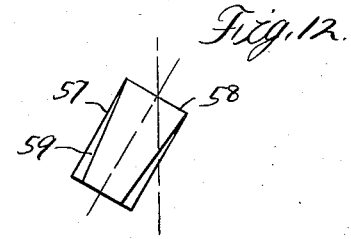
Inventor
Nikola Trbojevich Jan. 27, 1931.  N. TRBOJEVICH  1,790,606
WORM GEARING
Filed May 14, 1928   3 Sheets-Sheet 3
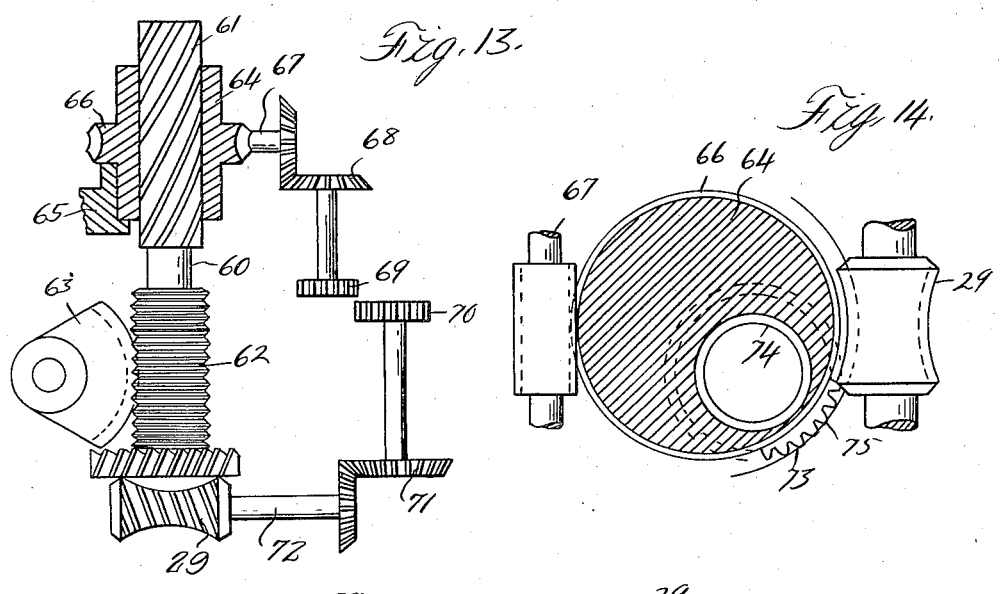
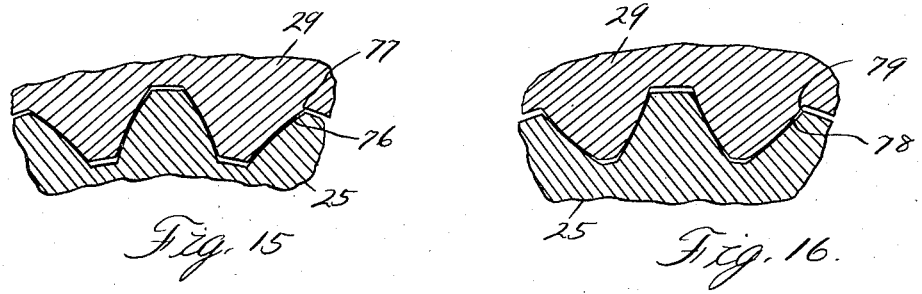
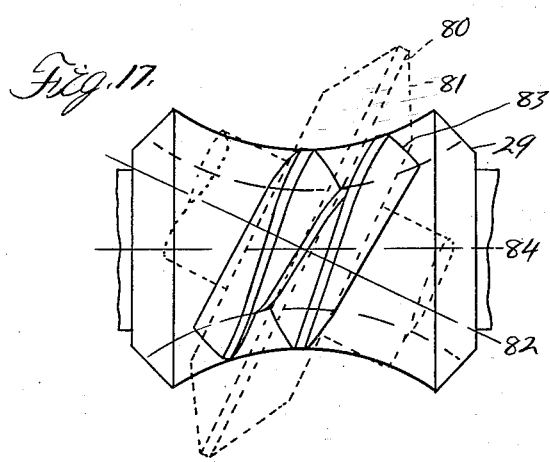
Inventor
Nikola Trbojevich
By
Attorneys Patented Jan. 27, 1931

1,790,606

UNITED STATES PATENT OFFICE

NIKOLA TRBOJEVICH, OF DETROIT, MICHIGAN

WORM GEARING

Application filed May 14, 1928. Serial No. 277,693.

The invention relates to a novel type of worm gearing which is particularly adapted to the axle drives of automotive vehicles and other such mechanisms.

The object of the invention is to so construct the worm and cooperating gear that an increased area of contact is obtained or, in other words, to increase the number of teeth which are simultaneously in engagement. A further object is to provide a construction of the above type wherein the teeth are of such form as to be capable of being manufactured by commercial methods, that is, by accurately milling, hobbing, shaping, etc.

To attain the above mentioned objects, I have provided a new type of worm gearing wherein the driving member or worm is of an hour-glass or of a globoid shape and has a plurality of threads which are tapering from the gorge or central plane in both directions at their peripheral boundary. The cross contour of the tapering threads also changes from point-to-point according to a predetermined law, the arrangement being such that the tooth of the wheel which mates with the worm thread shows a bearing or contact surface composed entirely of a family of circular helixes all having the same lead and all concentric about the same axis.

In the drawings—

Figures 1 and 2 are geometrical diagrams showing the manner in which an increased area of contact is obtained;

Figure 3 is the elevation of the improved worm and gear;

Figure 4 is the plane section 4—4 of the Figure 3;

Figure 5 is a diagram showing the location of the parallel planes in which the tooth contact may be analyzed;

Figure 6 is the plane section 6—6 of the Figure 5;

Figure 7 is the plane section 7—7 of the Figure 5;

Figure 8 is the plane section 8—8 of the Figure 5;

Figure 9 is the plan view of a hobbing machine capable of generating the new hour-glass worm;

Figure 10 is a detail view of Figure 9 taken in the plane 10—10.

Figures 11 and 12 show the method of sharpening and relieving respectively the cutting teeth of the cutter shown in Figures 9, 10, 13 and 14;

Figure 13 is a diagrammatic view of a modified Fellows gear shaper to cut hour-glass worm;

Figure 14 shows a modification of the machine represented in Figure 13 in which the cutter is mounted eccentrically;

Figures 15 and 16 are diagrams showing two principles of constructing the tooth curves of worm and gear;

Figure 17 diagrammatically shows the method of grinding the new worms.

Figures 1 and 2 diagrammatically show the benefit which is obtainable by the use of the new hour-glass worm gearing in comparison with the common or straight worm type. In the present worm driven automobile axles the driving member 21 is usually considerably smaller in diameter than the driven member 22 in order to obtain the required reduction or ratio, said ratio ranging from about four to fifteen. Heretofore, the worm number 21 has usually been made straight and the gear 22 of a hollow or globoid contour. In my improved construction the worm is made of globoid form and the gear straight. Assuming an angle α inside of which a contact is obtainable for a given pressure angle of gear teeth it will be seen that the contact area in the straight type worm is represented in Figure 1 by the circular segment A, B, and C, and in Figure 2 by the sector D, E, F and G, thus giving the volume of contact in the form of a saddle shaped solid. By employing an hour-glass worm 23 and by leaving the other dimensions including the limiting angle α intact it is seen that the area of contact in Figure 1 is considerably increased to form the sector H, I, J and K, while as shown in Figure 2 it is only slightly decreased as the two upper corners of the area D, E, F and G lying above the outside diameter 24 of the gear 22 have now been lost. The gain in the volume of contact is thus easily demonstrable whenever the worm is smaller than the wheel.

Figures 3 and 4 show the new worm drive in two projections. The driven member 25 is a cylindrical gear having a plurality of helical teeth 26, said teeth forming in any plane section parallel to the axis 27 a series of racks of constant pitch 28. Said racks are of a symmetrical tooth form in any axial plane (see Figures 4 and 6) and are "lop-sided" in any off-set plane, Figures 7 and 8. The tooth curves of said racks may be straight lines or curves according to as desired and as hereinafter pointed out there is a particular advantage obtained by making said curves concave.

The driving member 29 is an hour-glass worm having its spiral teeth 30 so formed that the tops of the said teeth are the widest in the midplane 4—4 and gradually taper off toward the right and left extremities of the worm as markedly indicated at W, Figure 3. Thus, the cross section of the thread is diminishing or tapering in both said directions, and the tapering is effected on the flank 31 of the thread facing the midplane 4—4 while the flank 32 facing outwardly remains of a substantially constant pitch.

The action of the new gearing will best be understood from Figures 5 to 8 inclusive. Figure 5 shows diagrammatically the gear 25 and the mating globoid worm 29 in elevation and indicates the position of the parallel planes 6—6, 7—7 and 8—8 in which the sections shown in Figures 6, 7 and 8 were respectively taken. As the members 25 and 29 rotate at a constant ratio and at a fixed center distance, the plane 33 represents the pitch surface of the drive and said plane is parallel to both axes 27 and 34 of the gears 25 and 29 respectively. In Figure 6 representing the midplane section 6—6 the rack 28 has a constant pitch $p$ and the worm lamina 36, which is nothing but an infinitely thin spur gear, is of the same pitch as measured on the pitch circle 35, said pitch circle touching the pitch plane 33 at M. When the helical gear 25 is rotated with a uniform angular velocity, the rack 28 moves parallel to the pitch line 33 and the lamina 36 rotates uniformly. Thus, the tooth curves 41 are generated according to the well known rack and spur gear principle.

In Figures 7 and 8 the rack elements 37 and 38, being non-radial sections of a helical gear, show a greater pressure angle on one side of the teeth than on the other, that is, they are lopsided. The pitch circles 39 and 40 of the laminas 42 and 43 touch the pitch line 33 at the points N and Q respectively and roll over it without sliding as was also the case in the Figure 6. The essence of this is, that due to the fact that we now have means of graphically and mathematically analyzing of just what happens in each parallel section of the worm 29 for a given shape of the helical gear 25 and a given selection of the pitch plane 33, we may so select said tooth shape and pitch plane that the worm 29, Figure 5, will have a full contact from end to end and will have well formed teeth showing no mutilation of tooth form due to secondary contacts at any place. Said secondary contacts manifest themselves in two ways, viz., as an "undercutting" at the root diameters of the laminas 36, 42 and 43, Figures 6 to 8 or as a "feather edge" at the tops of the teeth of the said laminas, see Figure 8. The first defect is caused either by a too small pressure angle at the rack element or by a too great distance of the pitch plane 33 from the bottom of the thread, Figure 5, or both, and the second defect is caused by just the opposite reasons, i. e. by too much pressure angle or an insufficient distance of the pitch plane from the axis 34.

Thus, in designing a pair of mating gears of this type to obtain the maximum area of the tooth bearing surface and the maximum load-carrying ability, I proceed as follows: The center distance and the respective numbers of teeth in the worm and gear are usually given and the helix angle $\beta$, Figures 3 and 4 should be selected as near to 45° as the strength of the worm will permit because a greater helix angle (up to 45°) gives a better efficiency and an easier coasting gear. From these data the distance of the pitch plane 33 from the axis 34, Figure 5, is fixed. The effect of increasing the helix angle $\beta$ is to push the plane 33 toward the axis 34 and thus to reduce the diameter of the worm 29, the same as in common worm gearing. After having the pitch plane 33 thus fixed, the next step is to build the worm thread about said pitch plane in such a manner that it will not become undercut in the midplane, Figure 6. Having thus located the bottom of the thread from the point M, Figure 6, as far as possible and still avoiding undercut, we investigate the feather edge conditions in the diagrams 7 and 8. If the result is not satisfactory, we change the pressure angle and the helix angle $\beta$ until a greater effective length of worm is obtained. If the feather edge starts too soon (in other words if there is insufficient contact area between worm and gear) it is necessary to lessen the pressure angle or the helix angle or both until greater contact area is produced. In such a manner, for instance, I succeeded in constructing a drive, 8 into 32 teeth, 30° helix angle, 16° pressure angle, which showed a full bearing extending over six teeth whereas a conventional worm gear of the same proportions would show only two to three teeth in contact.

The methods of manufacturing the new gearing will now be described. The method of making the gear 25, Figures 3 and 4, presents no difficulty as that member being a helical gear of a constant pitch and lead may be hobbed, shaped, milled or ground according to any one of the well known conventional methods.

The worm 29 is manufactured by a process which I discovered and which is somewhat similar to hobbing. Figure 9 represents a plan view of a common gear hobbing machine in which this process may be performed. The worm 29 is mounted upon the hob arbor 44 where ordinarily the hob is, and the cutter 45 is placed upon the work arbor 46, i. e., just the opposite of the conventional practice. When the arbor 44 is rotated, the motion of the worm 29 is transmitted to the cutter 45 in the timed relation through the bevel gears 47 and 48, the index change gears 49, the worm 50 and the worm gear 51. At the same time, the feed mechanism is actuated in a timed relation through the feed gears 52 and the feed screw 53, said feed screw engaging a corresponding nut in the slide 54 thus causing the same to move slowly over the ways 55 toward the cutter 45. The shaft 56 carrying the bevel gear 47 is splined in order to permit an uninterrupted rotation of the parts at all times and positions.

The axis 27 of the cutter 45 is situated above the axis 34 of the worm at the exact center distance Q required for the finishing cut, as shown in detail in Figure 10. It is of interest to note that in this construction the worm may be lifted out of the cutter or gear without causing the so-called "assembly interference" or mutilation of the tooth surfaces as is the case with the common Hindley worm.

The cutter 45 is similar in dimensions to the helical gear which it is desired to imitate in action such as the gear 25 in Figures 3 and 4. The hobbing machine shown in Figure 9 is so geared up by means of the change gears 49 and 52 that the cutter 45 will move relative to the blank 29 in an exactly predetermined helicoidal path. The teeth 57 of the cutter 45, Figure 11, are sharpened at their ends at the plane faces 58 preferably at right angles to the helix and they are relieved about the circumference and also along the side flanks 59 as indicated in Figure 12.

It is thus seen that the cutter employed in this process is of the same construction as the well known Fellows cutter. If the tooth curves and the diameter of the cutter are exactly the same as of the gear which it replaces, if the lead of feed exactly corresponds to the lead of said gear and if, by a proper design of tooth curves and the selection of the pitch plane as was pointed out in a previous paragraph, the mutilation of the generated surfaces in the worm is prevented, a virtually perfect hour-glass worm will be obtained having a full bearing from end to end and a line contact with the mating gear in each and every engaging tooth and at every instant.

Another method of generating the new hour-glass worm is shown in Figure 13. In view of the preceding, the arrangement need be only briefly described. The cutter 45 is mounted at the end of the ram 60, the upper part 61 of said ram being helically fluted to the exact lead of the cutter and the lower part 62 being of the shape of a circular rack. The gear segment 63 oscillates to and from and thereby causes the cutter 45 to reciprocate up and down. The helical part 61 of the ram engages the corresponding nut 64 which is rotatably held in the rigid frame 65 of the machine. The worm gear 66 is integral with the said nut 64 and is rotatable by means of worm 67 and the gears 67, 68, 69, 70 and 71. The worm 29 is also connected to the same train of gears by means of the shaft 72 so that a timed relation exists between the members 29 and 66.

The action of this machine is easily understood. Assuming the ram 60 to reciprocate up and down the train of gears 66 to 71 may be imagined as standing still and the cutter 45 will unscrew itself in and out in the nut 64 and its cutting edges will describe the helical tooth surfaces of the gear which it represents. If now the gear train 66 to 71 is actuated, the cutter 45 will rotate about its axis at the same rate of speed as the worm gear 66 and will therefore mesh with the worm 29 in a proper timed relation. The final result is similar to that obtained by means of the hobbing machine shown in Figure 9 except for the practical difference that the worm 29 is finished by means of an epicyclic tangential cut instead of a milling or hobbing cut.

Figure 14 shows a modification of the shaper shown in Figure 13. It was stated previously that the cutter 45 is an exact duplicate of the gear 25, Figure 3. It may happen, however, that said gear is rather large, and a correspondingly large cutter would be difficult and expensive to construct. With the object of overcoming this disadvantage I have devised a process in which a small cutter may be used for the manufacture of large worms.

The helical bore 74 in which the ram of the cutter 73 now reciprocates is eccentric relative to the circle of the gear 66. The members 67 and 29 are rotated in a timed relation as before. By this method only one particular tooth 75 of the cutter 73 will cut to the full depth of the worm thread and in order to finish all of the threads of the worm 29, the cutter 73 should be indexed once for each thread of the said worm.

In another modification I make the helical bore 74 in the form of a rotatable cylinder embedded in the body of the gear 66, and rotate said cylinder in a timed relation with the worm 29. In that case the process of generation will be continuous and no indexing for each thread of the worm will be required as it will be understood.

Figures 15 and 16 show the formation of the teeth of the gear 25 and the mating worm 29 according to two different principles. In Figure 15 the tooth curves 76 of the gear 25 are convex, preferably involutes, with the result that the corresponding curves 77 of the worm 29 will become concave. I use this method of forming the tooth curves when there is no need of grinding the worm threads after hardening.

In Figure 16, the tooth curves 78 of the gear are concave and the mating curves 79 of the worm are convex. In a special case, said curves 78 may be so developed that the mating curves 79 will become straight lines in a section perpendicular to the helix of the worm. In such a case, see Figure 17, a grinder 80 having a straight V shaped profile 81 and set perpendicular to the normal plane 82 may be used to grind two adjacent worm threads 83 on their adjacent sides. In order to grind the worm threads to an exact contour, the grinder 80 must be translated in a circular path in the plane 84 and in addition it must be oscillated in a helical path above and below said plane 84. This may be done by a mechanism similar to one shown in the Figure 14 as it will be understood.

Referring now again to Figure 3 it is seen that the chief characteristic of the new worm 29 is in that its threads are of a tapering and variable cross section which fact necessarily follows from the method of generation. As the generating tool of a constant cross section reciprocates in a helical path above and below the central plane of the worm, the pitch line 33, Figure 5, is suppressed toward the roots of the thread at both large ends of the worm, thus producing a tapering thread. Besides providing a full contact of the worm thread with the mating gear teeth this construction also permits of mounting the mating gears at slightly variable center distances. If, for instance, the center distance is slightly increased some of the bearing area will be lost, however, the gears will mesh at a constant velocity and without interference.

When especially free and fast running gears are required, I propose to generate the worm with a cutter larger in diameter than the corresponding mating gear. In such a case the bearing is slightly "eased off" toward the large ends of the worm thus providing a gradual approach for the entering teeth. This I accomplish by adding one or more teeth in the cutter above the corresponding number of teeth in the mating wheel if the worm is generated by method shown in Figure 9, or by suitably increasing the radius of the circle 66, Figure 14, if the worm be generated by the method of the eccentrically mounted cutter.

The type of gearing forming the subject matter of this application may also be constructed with their shafts disposed at an acute angle. If the shaft angle be suitably selected the driven member may be a spur gear having straight teeth.

It will be clear from the above description that compared with those of conventional forms the new worm gear offers a number of salient advantages, all the more important as they can be secured without appreciable increase in the cost of production. The new worm when constructed with an involute tooth form behaves in many respects similarly to an internal helical gear in that it will correctly mesh with all other involute helical gears of the same pitch and pressure angle having a pitch radius less than that of the circle 66, Figure 14, and will also correctly mesh with anyone of such gears in an offset position (offset being measured from the gorge plane of the worm) as clearly indicated in Figure 14. In such a manner mating globoid gears may now be constructed to fully incorporate the valuable involute principle in that they will correctly mesh even in the case when neither the worm nor the wheel are exactly centered along their respective axes and the center distance itself may be varied within a certain latitude without violating the said involute principle, similar to other kinds of involute gearing. These advantages are of great practical value when it comes to mass production as my design provides liberal manufacturing tolerances both in manufacturing and assembling and thus renders the globoid principle available, for the first time to my knowledge, to a cheap, rapid and accurate production of worm gearing.

Another advantage of the involute globoids, see Figure 15, is due to the fact that the flanks 17 of the worm are concave and of a variable radius of curvature. This feature makes the worm thread wider at the roots (compare with Fig. 16) and also makes the lines of pressure (which are perpendicular to the curves 77) converge at a definite distance from the wheel axis. For these two reasons the new worm is well adapted to absorb rapidly alternating loads and shocks.

What I claim as my invention is:—

1. A worm comprising a body of hour-glass shape having a spiral thread wound thereon, said thread being so formed that the side facing the gorge plane has a varying lead increasing from the gorge plane toward the outer ends, said thread having the opposite sides formed with a substantially constant lead.

2. In an hour-glass worm, the meridian curve of which is a section of a cylinder, a doubly tapering spiral thread so formed that the thread diminishes in width from each side of the gorge plane and its contour changes from point to point in such a manner that it will mesh with a circular gear lamina having equi-spaced teeth when the said lamina is rotated in unison with the worm and is simultaneously oscillated along its axis in a helical path.

3. A worm drive consisting of smaller hour-glass worm and a larger cylindrical gear having their axes non-intersecting and non-parallel in which the tooth surfaces of the gear are representable by a sweeping motion alone of a master curve in a path along the axis of the gear and the tooth surfaces of the worm are representable by the combination of the said sweeping motion of the said master curve in the said path with an intermeshing rolling motion obtained by rotating the worm and the said master curve about their respective axes in a timed relation.

4. A worm drive consisting of a smaller globoid worm and a larger helical gear having their axes disposed in two planes intersecting at a right angle in which the tooth surfaces of the gear are representable by a sweeping motion alone of a master curve in a helical path about the axis of the gear and the tooth surfaces of the worm are representable by the combination of the said sweeping motion of the said master curve in the said helical path with an intermeshing rolling motion obtained by rotating the worm and the said master curve about their respective axes in a timed relation.

5. A globoid worm having spiral teeth of a contour generated by rotating the worm about its axis, by rotating a predetermined master curve in a timed relation about another axis, said second axis being non-intersecting and non-parallel relative to the first axis and by translating the said master curve parallel to itself in a direction transverse to the axis of the worm.

6. A globoid worm having spiral teeth of a contour generated by rotating the worm about its axis, by rotating a predetermined master curve in a timed relation about another axis at right angles to the first axis and by translating the said master curve parallel to itself in a direction transverse to the first axis.

7. A globoid worm having spiral teeth of an involute contour, said contour being obtained by rotating an involute of a circle in a timed relation about its axis, said axis being non-intersecting and non-parallel relative to the first axis and by translating the said involute parallel to itself in the direction of the second axis.

8. A globoid worm having spiral teeth of an involute contour, said contour being obtained by rotating an involute of a circle in a timed relation about its axis, said axis being non-intersecting and non-parallel relative to the first axis and by translating the said involute parallel to itself in the direction of the second axis and in a helical path.

9. An involute globoid worm having a predetermined pitch and pressure angle and a tooth contour capable of correctly meshing with an involute gear lamina of the same pitch and pressure angle when the said lamina is placed in the axial plane of the worm tangentially relative to the worm threads and is rotated simultaneously about its own axis and also about the axis from which the meridian circle of the worm is drawn.

10. An involute globoid worm having spiral teeth of an involute contour capable of correctly meshing with an involute spur gear lamina of the same pitch and pressure angle as the worm when the said lamina is placed tangentially in the axial plane of the worm and is oscillated up and down along its axis in a helical path.

11. A gear drive comprising a smaller member of globoid and larger one of a cylindrical contour, the former having generated teeth of variable cross section but all derived from a predetermined base cylinder and the latter having equi-spaced involute teeth of a constant cross section aligned along a plurality of helixes drawn from a common base cylinder, the geometrical relation being such that the pitch and pressure angle are the same in both members, and the base cylinder of the globoid member is always equal to or greater than the base cylinder of the wheel member to provide a predetermined degree of enveloping contact.

12. A globoid worm comprising a plurality of spiral thread convolutions of a concave thread cross contour in the axial plane thereof in which the radius of curvature of the said cross contour gradually increases as measured from the tips toward the roots of the said thread and capable of correctly meshing with a helical wheel of the same pitch and pressure angle and having tooth surfaces convex at all points thereof.

13. A globoid worm comprising a plurality of spiral thread convolutions of a concave cross contour in the axial plane in which the said contours are substantially of an inverted involute curvature such as might be developed from a base circle which is concentric with the meridian pitch circle of the worm and of a less radius than the said meridian circle.

In testimony whereof I affix my signature.

NIKOLA TRBOJEVICH.